US008417689B1

(12) United States Patent
Waas et al.

(10) Patent No.: US 8,417,689 B1
(45) Date of Patent: Apr. 9, 2013

(54) PROGRAMMING MODEL FOR TRANSPARENT PARALLELIZATION OF COMBINATORIAL OPTIMIZATION

(75) Inventors: Florian Waas, San Francisco, CA (US); Mohamed Soliman, San Mateo, CA (US); Konstantinos Krikellas, San Mateo, CA (US)

(73) Assignee: EMC Corporation, Hopkinton, MA (US)

(*) Notice: Subject to any disclaimer, the term of this patent is extended or adjusted under 35 U.S.C. 154(b) by 0 days.

(21) Appl. No.: 13/301,722

(22) Filed: Nov. 21, 2011

(51) Int. Cl.
G06F 17/30 (2006.01)

(52) U.S. Cl.
USPC ........... 707/713; 707/718; 707/770; 707/966; 718/100; 718/103; 718/106

(58) Field of Classification Search .................. 707/713, 707/718, 770, 966; 718/100, 103, 106
See application file for complete search history.

(56) References Cited

U.S. PATENT DOCUMENTS

| 5,619,692 | A | * | 4/1997 | Malkemus et al. ............... 1/1 |
| 5,752,031 | A | * | 5/1998 | Cutler et al. ................... 718/103 |
| 5,873,075 | A | * | 2/1999 | Cochrane et al. ................ 1/1 |
| 5,903,886 | A | * | 5/1999 | Heimlich et al. ............... 706/50 |
| 6,035,307 | A | * | 3/2000 | Martin et al. .................. 1/1 |
| 6,138,171 | A | * | 10/2000 | Walker ......................... 719/318 |
| 6,625,593 | B1 | * | 9/2003 | Leung et al. ................... 1/1 |
| 7,080,062 | B1 | * | 7/2006 | Leung et al. ................... 1/1 |
| 7,984,043 | B1 | * | 7/2011 | Waas .......................... 707/718 |
| 2002/0100025 | A1 | * | 7/2002 | Buechner et al. .............. 717/131 |
| 2003/0172059 | A1 | * | 9/2003 | Andrei .......................... 707/3 |
| 2004/0122845 | A1 | * | 6/2004 | Lohman et al. ................ 707/102 |
| 2005/0004907 | A1 | * | 1/2005 | Bruno et al. .................... 707/4 |
| 2005/0071331 | A1 | * | 3/2005 | Gao et al. ....................... 707/4 |
| 2006/0020573 | A1 | * | 1/2006 | Galindo-Legaria et al. ...... 707/1 |
| 2006/0218123 | A1 | * | 9/2006 | Chowdhuri et al. ............. 707/2 |
| 2007/0130107 | A1 | * | 6/2007 | Waas et al. ..................... 707/2 |
| 2007/0162268 | A1 | * | 7/2007 | Kota et al. ...................... 703/14 |
| 2007/0162531 | A1 | * | 7/2007 | Kota ........................... 708/200 |
| 2007/0250473 | A1 | * | 10/2007 | Larson et al. ................... 707/2 |
| 2007/0277122 | A1 | * | 11/2007 | Frijlink et al. ................. 715/854 |
| 2008/0154844 | A1 | * | 6/2008 | Gao et al. ....................... 707/2 |
| 2008/0263001 | A1 | * | 10/2008 | Lohman et al. .................. 707/2 |
| 2009/0037367 | A1 | * | 2/2009 | Wein ............................ 707/2 |
| 2009/0327668 | A1 | * | 12/2009 | Sudzilouski et al. ........... 712/225 |
| 2010/0030896 | A1 | * | 2/2010 | Chandramouli et al. ...... 709/224 |
| 2010/0042631 | A1 | * | 2/2010 | Shuf et al. ..................... 707/100 |
| 2011/0153546 | A1 | * | 6/2011 | Latta et al. .................... 706/54 |
| 2011/0282517 | A1 | * | 11/2011 | Streichert et al. ............... 701/1 |
| 2011/0307433 | A1 | * | 12/2011 | Dlugosch ....................... 706/45 |
| 2012/0117065 | A1 | * | 5/2012 | Nehme et al. .................. 707/737 |

* cited by examiner

*Primary Examiner* — Hanh Thai
(74) *Attorney, Agent, or Firm* — Van Pelt, Yi & James LLP

(57) ABSTRACT

Each of a plurality of subtasks is configured to explore and assess alternative solutions for a combinatorial optimization problem by a reentrant finite state machine is represented. Each of a plurality of threads is configured to perform operations comprising a subtask until either completion or a blocked state is reached and, in the event a blocked state is reached, to move on to performing another subtask that is not currently in a blocked state.

15 Claims, 5 Drawing Sheets

PROGRAMMING MODEL FOR TRANSPARENT PARALLELIZATION OF COMBINATORIAL OPTIMIZATION

BACKGROUND OF THE INVENTION

Dynamic programming involves solving optimization problems by determining optimized solutions of sub-problems of the original problem through combining. A simple example is the coin-changing problem: how does one make change for a specific amount using the fewest coins of a given currency? By solving sub-problems of making change for smaller amounts using the fewest coins, one can combine the sub-problems and the combination is the solution for making change for the specific amount.

The hierarchical nature of this combinatorial optimization process is supported by programming language facilities such as recursive function calls which preserve state of a problem, invoke the optimization of a sub-problem, and, once the sub-problem is solved, return to the original problem and continue with original state as preserved. This works well in non-parallel computing environments with a single processing thread.

In a parallel environment with a plurality of processing threads, these common programming language facilities are not directly applicable. Processing threads must be mapped in a time-share fashion to sub-problems, recursion may not function as expected with different threads exploring different problems in real-time. In addition, the number of sub-problems may exceed the number of threads significantly.

There exists a need for a programming model for parallelization of dynamic programming to solve combinatorial optimization problems.

BRIEF DESCRIPTION OF THE DRAWINGS

Various embodiments of the invention are disclosed in the following detailed description and the accompanying drawings.

DETAILED DESCRIPTION

Figure 1:
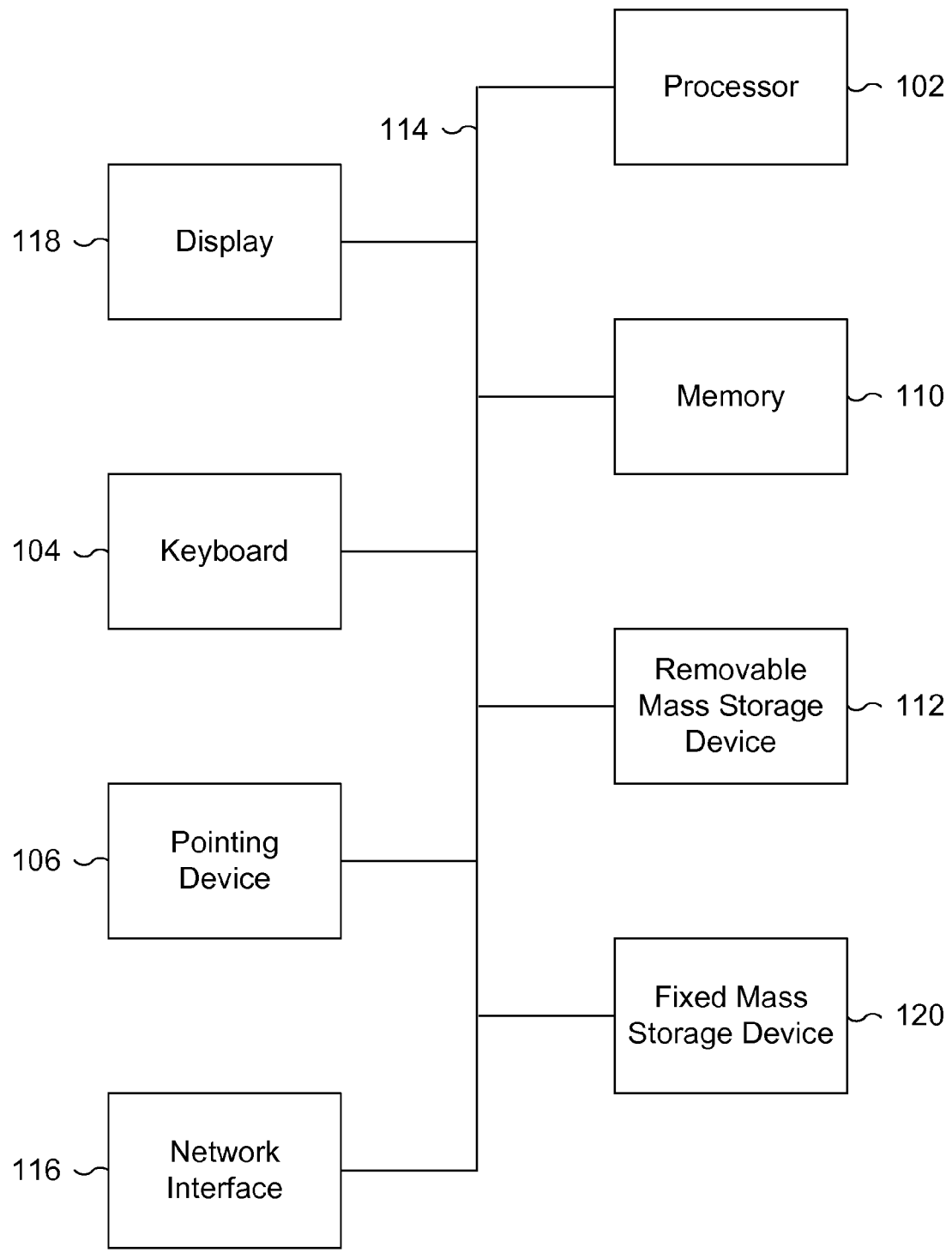
FIG. 1 is a functional diagram illustrating a programmed computer system for distributed workflows in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Numerous optimization problems are hierarchical by nature: the optimal solution to a problem is comprised of optimal solutions of sub-problems of the original problem. The underlying optimization principle is called dynamic programming. An important characteristic is that the same sub-problem may arise multiple times as a component of different larger problems. To avoid solving the same sub-problem multiple times over, a description of the problem and the best solution are stored. Whenever a sub-problem reoccurs the previous solution can be immediately used, short-cutting the optimization effectively.

Using this principle, the optimization algorithm boils down to a divide and conquer strategy: break problem into sub-problems, if the sub-problem has been solved already, immediately use the best solution found previously; otherwise, proceed recursively by breaking sub-problem into even smaller sub-problems, and so on. The smallest sub-problem granularity is solved without future decomposition. The various steps of breaking down a problem, identifying a solution, combining solutions an so forth are referred to as an "optimization task" or "optimization step" throughout this specification.

For a sub-problem to be solved all its sub-problems must be solved completely before proceeding. Note that many sub-problems are independent of each other and offer significant degree of parallelism if worked on independently. To parallelize dynamic programming efficiently, a programming model is disclosed that:

1. enables effective encoding of optimization steps;
2. enables a single-thread view on the problem, that is, it manages parallelism transparently; and
3. manages state of an optimization step, in part by encoding, preserving, and restoring the state of an optimization step.

FIG. 1 is a functional diagram illustrating a programmed computer system for distributed workflows in accordance with some embodiments. As shown, FIG. 1 provides a functional diagram of a general purpose computer system programmed to execute workflows in accordance with some embodiments. As will be apparent, other computer system architectures and configurations can be used to execute workflows. Computer system 100, which includes various subsystems as described below, includes at least one microprocessor subsystem, also referred to as a processor or a central processing unit ("CPU") 102. For example, processor 102 can be implemented by a single-chip processor or by multiple cores and/or processors. In some embodiments, processor 102 is a general purpose digital processor that controls the operation of the computer system 100. Using instructions retrieved from memory 110, the processor 102 controls the reception and manipulation of input data, and the output and display of data on output devices, for example display 118.

Processor 102 is coupled bi-directionally with memory 110, which can include a first primary storage, typically a random access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions, for example programmed instructions. For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory, not shown.

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110, for example RAM, as virtual memory.

In addition to providing processor 102 access to storage subsystems, bus 114 can be used to provide access other subsystems and devices as well. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Throughout this specification "network" refers to any interconnection between computer components including the Internet, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, WiFi, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor 102 through network interface 116.

An auxiliary I/O device interface, not shown, can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Without loss of generality, one embodiment of a programming model for transparent parallelization of combinatorial optimization is database query optimization.

Figure 2:
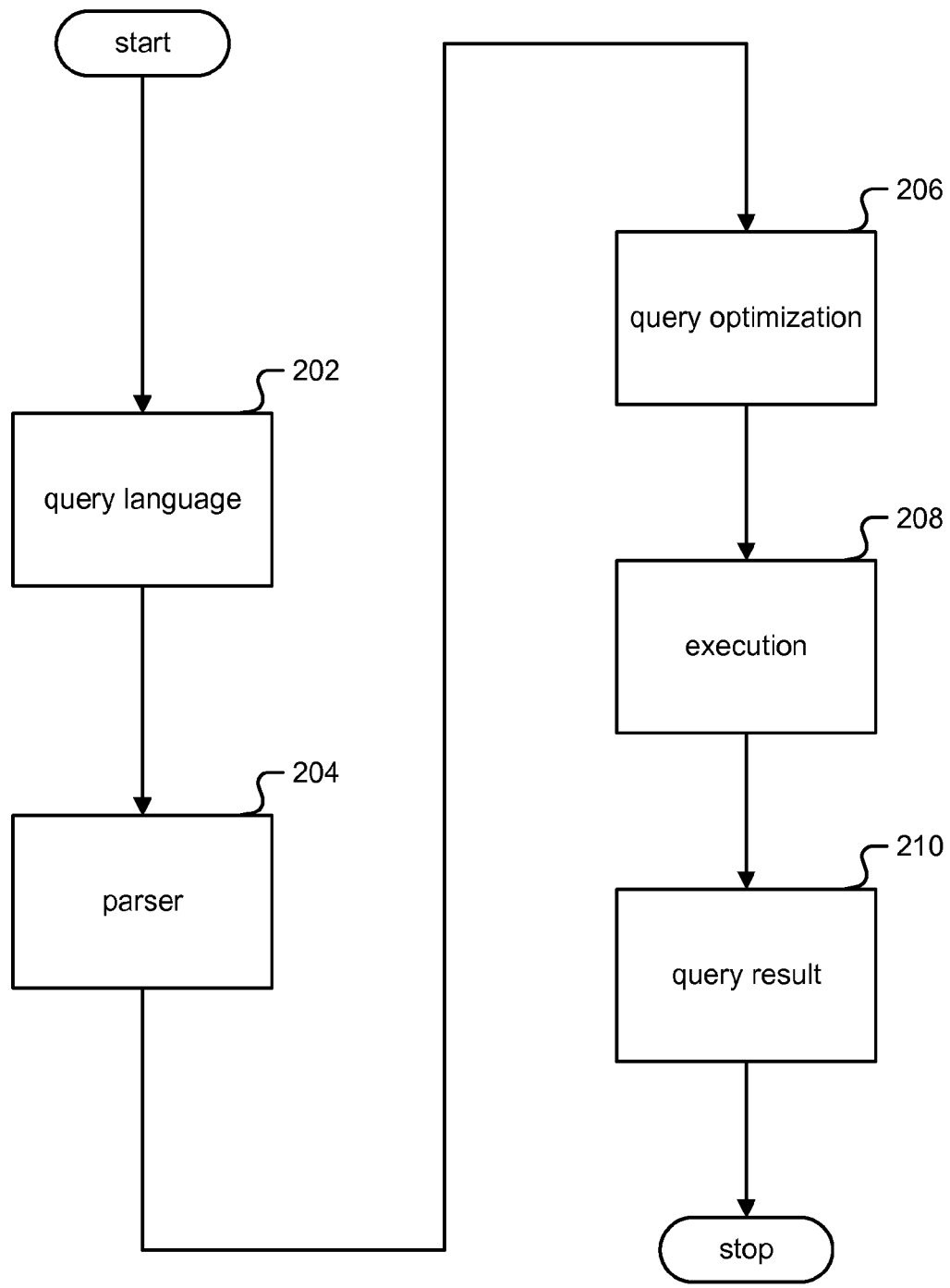
FIG. 2 is a flowchart illustrating an example of a database query lifecycle.

FIG. 2 is a flowchart illustrating an example of a database query lifecycle. In step 202 a query is formed by a user/developer, usually in a high-level language, for example Structured Query Language ("SQL"). In step 204, the query is parsed and in step 206 query optimization begins. A query optimizer is the component of a database management system that is responsible for determining the most efficient query execution plan. An execution plan determines the execution order of a set of relational operators. A plan can be represented as a tree whose nodes correspond to query operators.

In step 208 the optimizer's query execution plan commences and in step 210 the query result is returned to the user/developer.

Figure 3:
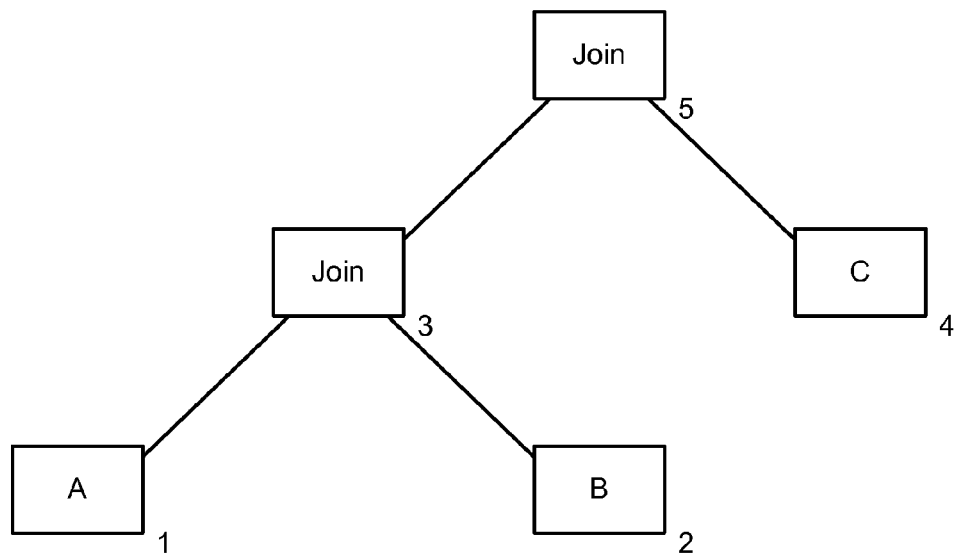
FIG. 3 is a block diagram illustrating an example of a query plan tree.

FIG. 3 is a block diagram illustrating an example of a query plan tree. Without loss of generality, the example uses SQL. A sample query might include:

SELECT *
FROM FLIGHTS F
   WHERE F.FROM='SFO'
   AND F.TO='BOI' to look up the airline flights from San Francisco, Calif. to Boise, Id. There may be 100,000 flights in table FLIGHTS, of which 600 originate from SFO, and also of which 10 terminate in BOI.

In terms of algebra operators/iterators, it would be preferable to execute (shown in a flow graph from the bottom up) because BOI has less flights than SFO:

FILTER FROM=SFO
↑
FILTER TO=BOI
↑
GET (FLIGHTS)

instead of:

FILTER TO=BOI
↑
FILTER FROM=SFO
↑
GET (FLIGHTS)

The breakdown into these logical operators genericizes the query optimization problem because each operator is unaware of the other operators. Operators may operate on one data stream, for example unary operators/iterators, two data streams, for example binary operators/iterators, and so on to n-ary operators/iterators. As well, zero-ary and/or terminal operators exist without any input, for example GET (FLIGHTS). In some embodiments there are twenty to fifty operators available for execution. Operators may operate on a per-row basis, for example FILTER, may operate on sets of rows, for example a COUNT operator to count the flights between SFO and BOI.

Typically the query optimizer takes an initial plan from a standard representation, and may introduce new operators, reorder the operators and analyze the query plan based on a cost model. The cost model may be based on cost points based on statistics based on running actual queries.

FIG. 3 represents a similar query plan tree as an abstraction with table A, table B, and table C and the Join operator. The query plan tree can be divided into subgroups of problems, represented by the numbers one through five.

A table that may possibly represent the tree in FIG. 3 is:

| GROUP | GROUP EXPRESSION |
|---|---|
| 5 (Root Group) | Join (3, 4) |
| 4 | C |
| 3 | Join (1, 2) |
| 2 | B |
| 1 | A |

For example, subgroup 1 requires the solution of "A", subgroup 2 requires the solution of "B", subgroup 3 requires the solution of "Join(Subgroup 1, Subgroup 2)", etc. For each row of 1-4, each group expression represents the optimal solution of the appropriate subgroup. Given a monotonic cost function, the optimal solution of the root group, or overall query, is made up of the optimal solutions of the subgroups. Furthermore, once a solution has been solved it need not be reexamined.

The Join operator is commutative, so to optimize the query more group expressions must be evaluated for their cost:

| GROUP | GROUP EXPRESSION |
|---|---|
| 5 (Root Group) | Join (3, 4), Join (4, 3) |
| 4 | C |
| 3 | Join (1, 2), Join (2, 1) |
| 2 | B |
| 1 | A |

As well, a query optimizer will recognize that a Join of A, B, and C may be executed in a different order as well, such that a new row in the table is introduced:

| GROUP | GROUP EXPRESSION |
|---|---|
| 6 (Root Group) | Join (3, 4), Join (4, 3), Join (2, 5), Join (5, 2) |
| 5 | Join (1, 4), Join (4, 1) |
| 4 | C |
| 3 | Join (1, 2), Join (2, 1) |
| 2 | B |
| 1 | A |

This can be extended to also include the Join (2,4) as well and so forth.

Join is an example of a logical operator that can be implemented physically with different algorithms, for example a Join can be a Sort-Merge Join, a Hash Join, and a Nested-Loop Join. To explore the cost function for each group expression thus can be further expressed in the table. An example of group 3's group expression could thus be:

Join (1, 2), Join (2, 1), SMJ (1, 2), HJ (1, 2), NLJ (1, 2), SMJ (2, 1), HJ (2, 1), NLJ (2, 1) . . .

Similarly, including a table scan physical operator, an example of group 1's group expression could include:

A, TableScan (A), . . .

There are several stages to query optimization based on the standard representation from the parser 204. The first stage involves exploration where logical operators are transformed to generate logical alternatives based on a set of rules, for example the Join commutative rule: For a Join (X,Y), generate Join (Y,X). In some embodiments there are over 300 transformations in the set of rules. The second stage involves, for each logical operator a generation of each associated physical operators.

Figure 4:
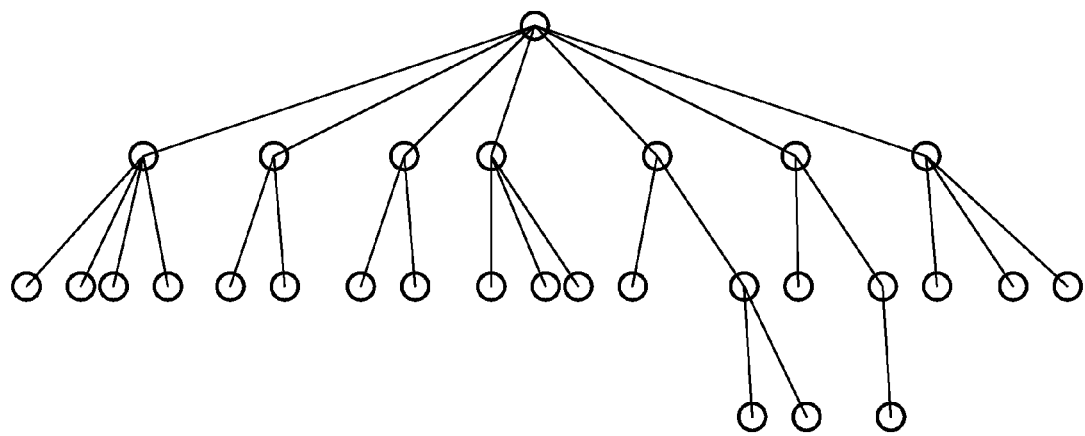
FIG. 4 is an illustration of an example of a hierarchical task graph indicating independence of the subtasks.

FIG. 4 is an illustration of an example of a hierarchical task graph indicating independence of the subtasks. Query optimization is primarily CPU-bound in resources, rather than memory or bandwidth-bound. For query optimization, the graph as a tree is typically flat and not particularly deep. In FIG. 4, to complete a task, all children subtasks below must be complete. Thus, a given free processing thread may process any subtask that is independent, mainly found in the leaves of the FIG. 4 tree. Identification of the parallelization opportunities can be performed via the graph.

In one embodiment, a data structure that encodes a space of the optimization alternatives for a given query is named memoization look-up table, abbreviated as "Memo". Memoization, which is not the same as memorization, is a technical term in the field of functional programming and throughout this specification refers to evaluating a function once and retaining the result to shortcut future calls of the function. The Memo maintains a set of groups representing the different sub-goals of a query plan, where each sub-goal corresponds to a node in the query plan tree. Each group contains a number of planning alternatives, represented as different group expressions, that all achieve the group's goal. Each group expression is a relational operator, for example join, having other groups as children. Such a recursive structure of the Memo may allow implicit encoding of many possible operator trees, which provides a highly compact encoding of the optimization space.

Group expressions have two main types of operators: logical and physical. A logical operator specifies a relational operation, for example join, without specifying how to perform it, whereas a physical operator is a specific implementation of a relational operation, for example hash join, sort-merge join and nested loop join.

In one embodiment, optimizing a given query starts by copying-in a logical operator tree of the query into the Memo, such that each operator is mapped to one group. A specific group, corresponding to plan's root, is designated as the root group of the Memo. The different implementation alternatives of the given query are derived by applying exploration rules that produce equivalent logical expressions, for example Join (A, B)→Join (B, A), and implementation rules that produce physical implementations of logical expressions, for example Join(A, B)→Hash Join (A, B). The expressions produced by such rules are copied-in to the Memo, which may result in creating new groups and/or adding new expressions to existing groups. When the set of required rules is completely applied to group expressions, the cheapest execution plan is copied-out of the Memo by picking, starting from the root group, the implementation alternatives that achieve the smallest cost.

The query optimization task may be divided into a number of optimization subtasks that depend on each other:

Optimize Group. This subtask takes as inputs a group, and an optimization context, which is a set of required physical properties such as the sort order of query output tuples. The subtask returns the most efficient execution plan that implements the group under the given optimization context. Optimizing a group entails implementing the group, as described in the next optimization subtask.

Implement Group. This subtask creates implementations of logical group expressions in a given group. Implementing a group entails first exploring the group, and then iteratively implementing group expressions, as described in the next optimization subtasks.

Explore Group. This subtask creates logically equivalent expressions of the logical group expressions in a given group. Exploring a group entails exploring group expressions, as described in the next optimization subtasks.

Explore Group Expression. This subtask creates logically equivalent expressions of a given logical group expression. Exploring a group expression entails transforming group expression into a set of equivalent logical expressions, as described in the next optimization subtask.

Transform Group Expression. This subtask applies a given transformation rule to a logical group expression. A rule is specified using a pattern tree, which is used to match operator trees in the Memo, and a result tree, which describes how output looks like after applying the transformation to the pattern tree. For example, a join commutativity rule has a pattern tree 'Join(*1,*2)', where * denotes an arbitrary operator, and a result tree 'Join(*2,*1)'. A transformation rule can be either an exploration rule, where both pattern tree and result tree are composed of logical operators, or an implementation rule, where only pattern tree is composed of logical operators whereas result tree is composed of physical operators.

Implement Group Expression. This subtask creates implementation alternatives of a given logical group expression. Implementing a group expression entails first implementing the child groups of the group expression, and then transforming group expression into possible physical implementation alternatives, as described in the next optimization subtask.

The breakdown of query optimization task into multiple subtasks enables a clean and modular design of the optimizer. In one embodiment, the design is to encode different subtasks as separate functions that call each other within one thread of execution. In one embodiment, an alternate design is to exploit parallelization opportunities among subtasks and have them run concurrently in different threads. For example, Explore Group subtasks running on different groups can execute in parallel.

For clean and extensible design of optimization subtasks, dependencies that exist among subtasks are taken into account:

Execution Order:

Beginning the execution of some subtasks may depend on completing the execution of other subtasks. For example, an Implement Group subtask does not start execution until an Explore Group subtask, on the same group, has already completed execution. Thus state information needs to be passed among different subtasks.

Reentrance:

During its execution, an optimization subtask s1 may need to be temporarily suspended until another subtask s2 terminates. When s1 resumes execution, it may pick up from the point where it last stopped. Each subtask may need to be reentrant, and maintains its state information during its lifetime. For example, when an Explore Group subtask s1 triggers the execution of an Explore Group Expression subtask s2, the following sequence of operations may take place:

s1 suspends its execution waiting for s2 to terminate;

if s2 has generated new group expressions, s1 needs to be resumed to trigger the exploration of these new expressions. Then, s1 goes back to suspension state; and if s2 has not generated any new expressions, s1 is resumed, and then it can immediately terminate.

Maintaining the information that s1 has triggered group expression exploration subtasks, before being suspended, may be essential to know what actions to take when s1 resumes execution.

Query Optimization Implementation.

Fine-grained breakdown provides for more robust software, is easier to verify, is easier to modify, and provides better debugability of the system. Each optimization subtask is thus represented using a finite set of states.

Figure 5:
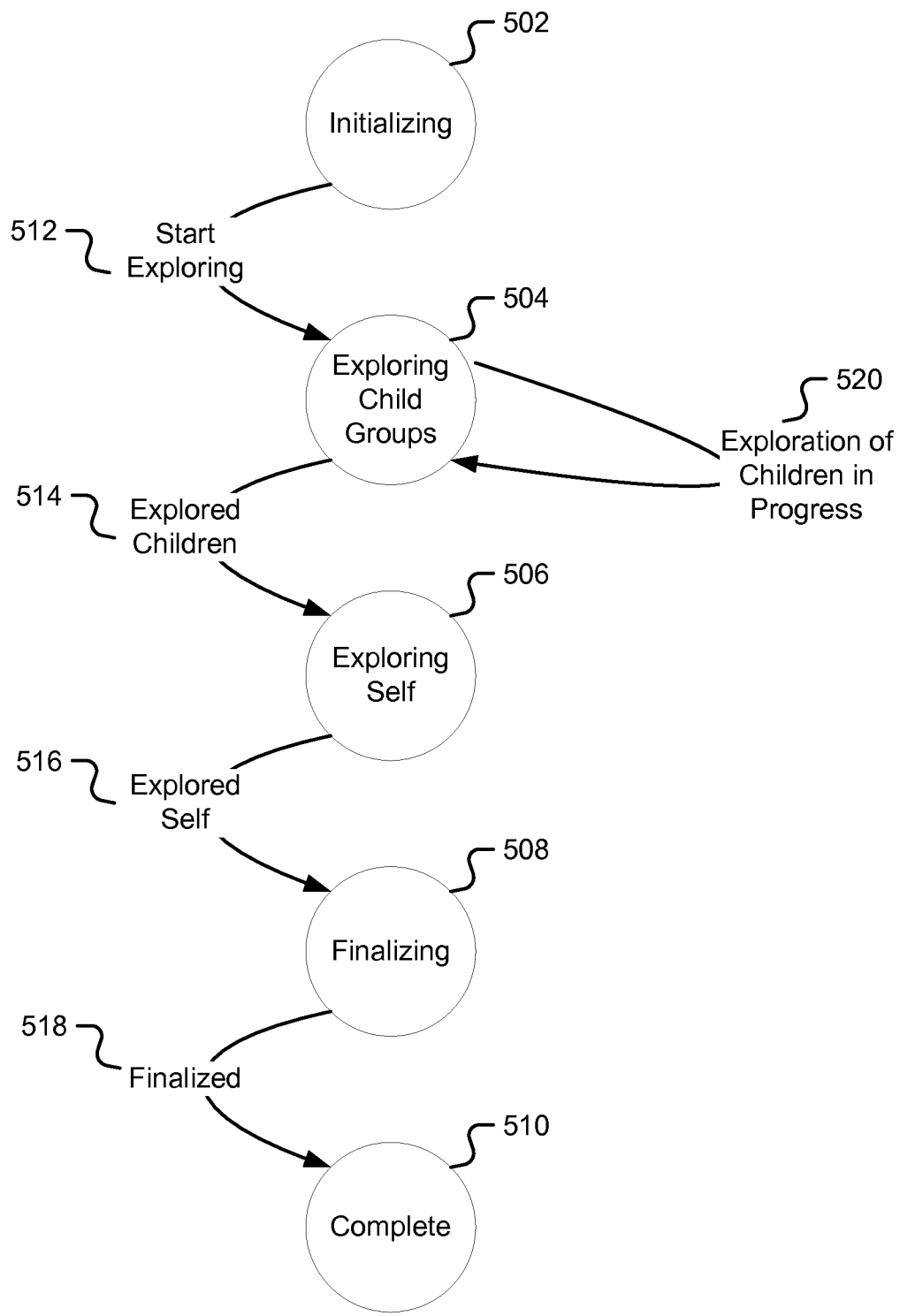
FIG. 5 is a flow diagram illustrating an embodiment of a finite state machine for an Explore Group Expression subtask.

FIG. 5 is a flow diagram illustrating an embodiment of a finite state machine for an Explore Group Expression subtask. The set of states for FIG. 5 include:

Initializing (502): In this state, optimization subtask is initialized and allocates the required resources.

Exploring Child Groups (504): In this state, the child groups of group expression are iterated upon, triggering the execution of an Explore Group subtask on each child group.

Exploring Self (506): In this state, the exploration rules applicable to the group expression are iterated upon, and trigger the execution of a Transform Group Expression subtask for each exploration rule.

Finalizing (508): In this state, the resources used by the subtask are cleaned up, and set the state of group expression to 'explored' to prevent redoing the same subtask later.

Complete (510): This is the subtask's terminal state.

Transitions among states are controlled by events that are triggered by the subtask based on the feedback it gets from other subtasks. This essentially defines a deterministic state machine per subtask that encodes subtask's lifecycle. For example, in the previous Explore Group Expression subtask, events include:

Start Exploring (512): This event is triggered after the subtask is initialized. The event causes moving the state machine from Initializing state to the Exploring Child Groups state.

Explored Children (514): This event is triggered when the child groups' exploration is complete. The event causes moving the state machine from the Exploring Child Groups state to the Exploring Self state.

Explored Self (516): This event is triggered when exploration rules have been completely applied to group expression. The event causes moving the state machine from the Exploring Self state to the Finalizing state.

Finalized (518): This event is triggered after subtask has been finalized. The event causes moving the state machine from the Finalizing state to the Complete state.

There is also a primary loop, Exploration of Children in Progress (520) that iterates through the exploration of each of the children while in state Exploring Child Groups (504).

Each state is associated with an action, which is a function that includes the logic pertinent to this state. The return value of each action is an event that is used to, in some cases, change the state machine's current state. The subtask continues execution until the state machine reaches the terminal state.

Executing an optimization subtask reduces to a simple and generic procedure that runs a finite state machine, including to:

i. Retrieve the subtask's current state;
ii. Load and execute the action associated with the current state; and
iii. Input the event returned by the action to the subtask's state machine, and examine the new state of the state machine. If the state machine is in terminal state, then end subtask execution. If state machine is in a new state, go back to step (i). Otherwise, state machine is still in the same state, and subtask is suspended until dependent subtasks are complete.

Building an optimizer using the proposed state machine framework is enabled as follows:

i. Define a state machine for each optimization subtask.
ii. For each optimization subtask, create a separate function that includes the logic pertinent to each subtask state.
iii. Run the state machine of the main optimization subtask, for example Optimize Group on the root group for query optimization.

Without loss of generality these principles may be extended beyond query optimization to other dynamic programming problems. These principles support parallel computation of sub-problems in combinatorial optimization paradigms.

Benefits.

One of the most important benefits of this model is that it can be parallelized without having to consider parallelism in the state machine and without knowing the parallel nature of the underlying system.

Modularity:

The disclosed programming model for transparent parallelization of combinatorial optimization provides a fine-grained decomposition of the logic of each optimization subtask as a set of smaller actions with predefined transitions provides a great potential for extensibility and better modular design of the query optimization task.

Autonomy:

The disclosed programming model for transparent parallelization of combinatorial optimization introduces a simple mechanism for self-maintaining the execution states of different optimization subtasks. That is, subtasks act as autonomous objects that do not rely on a centralized entity for monitoring their states or resuming their execution from a particular point. Each subtask internally maintains, using its state machine, the state at which it has stopped execution. In addition, subtasks can exchange their state information by directly querying each other. This provides clear scalability benefits.

Debugability:

The ability of debugging optimizer code can be largely improved using the disclosed programming model for transparent parallelization of combinatorial optimization, since a developer can isolate a small portion of the logic, for example an action, that potentially introduces a bug. In addition, state machines allow for a simple mechanism to track the execution history of each optimization subtask by recording the sequence of visited states and triggered events during subtask execution, which allows for easy identification of irregularities.

The disclosed programming model for transparent parallelization of combinatorial optimization can be seamlessly integrated into modern transformation-based query optimizers and other dynamic programming problems. Many query optimizers build on the concepts of memoization and functional decomposition for scalability and extensibility. It can be used by new query optimizers for targeting massive parallelization and scalability objectives.

Figure 6:
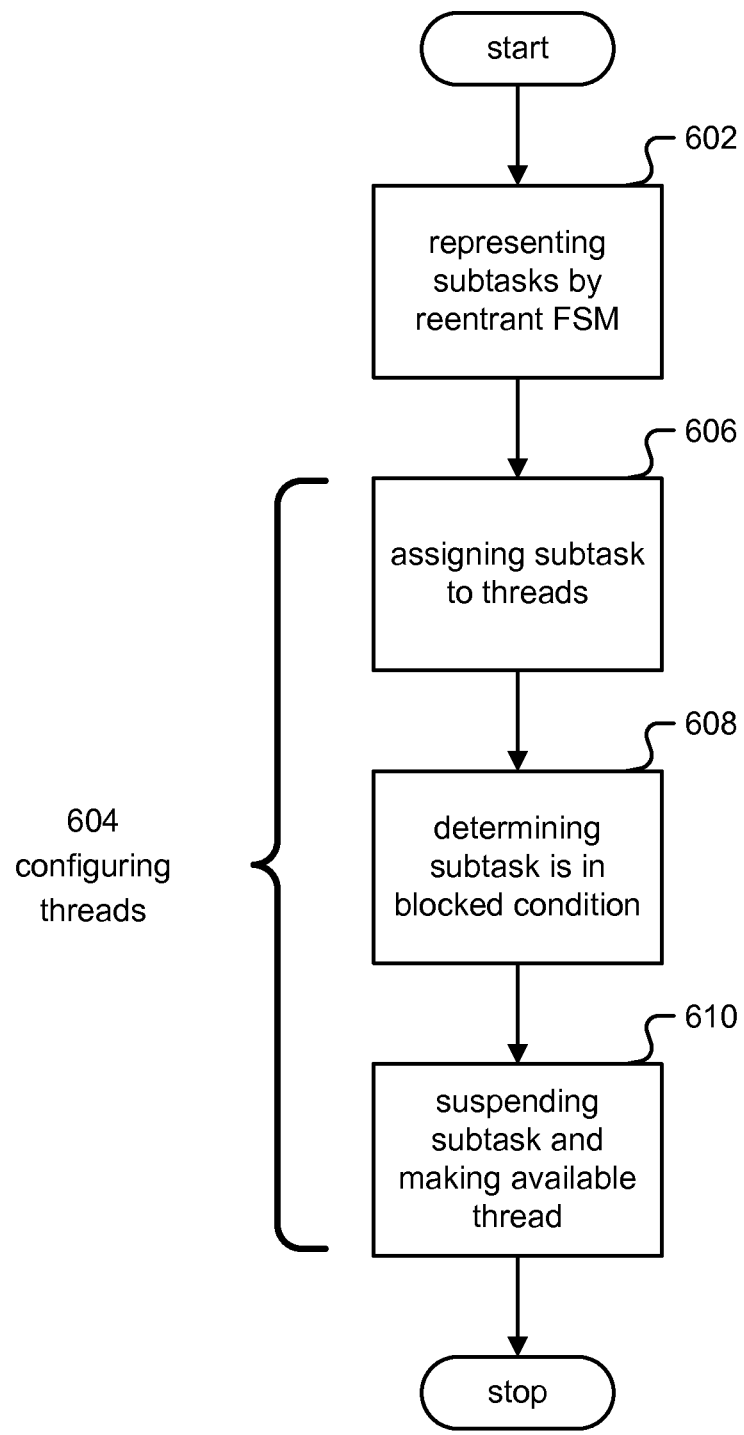
FIG. 6 is a flowchart illustrating an example of a programming model for transparent parallelization of combinatorial optimization.

FIG. 6 is a flowchart illustrating an example of a programming model for transparent parallelization of combinatorial optimization. In step 602, a plurality of subtasks configured to explore optimization alternatives for a combinatorial optimization problem are represented by a reentrant finite state machine. In step 604, each of a plurality of threads are configured to perform operations comprising a subtask until either completion or a blocked state is reached and, in the event a blocked state is reached, to move on to performing another subtask that is not currently in a blocked stated.

For example, one embodiment of step 604 may be step 606, wherein a first subtask of the plurality of subtasks is assigned to a first processing thread, and a second subtask of the plurality of subtasks is assigned to a second processing thread. Furthermore an example of step 604 may be step 608, wherein it is determined that processing a current state of a first state machine associated with the first subtask is in a blocked condition that cannot be completed until the second subtask has been completed. Furthermore an example of step 604 may be step 610, wherein the first state machine is suspended for future reentrance and the first processing thread is made available to perform a third subtask not currently in the blocked condition.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
representing each of a plurality of subtasks configured to explore optimization alternatives for a combinatorial optimization problem by a reentrant finite state machine;
representing a space of optimization alternatives for a combinatorial optimization problem by a recursive data structure, wherein the reentrant finite state machine includes a state to store a solution to the given subtask in the data structure;
using a processor to assign a first subtask of the plurality of subtasks to a first processing thread, and a second subtask of the plurality of subtasks to a second processing thread;
determining that processing a current state of a first state machine associated with the first subtask is in a blocked condition that cannot be completed until the second subtask has been completed; and
suspending the first state machine for future reentrance and making the first processing thread available to perform a third subtask not currently in the blocked condition.

2. The method of claim 1, wherein suspending the first subtask comprises storing a current state of the reentrant finite state machine associated with the first subtask.

3. The method of claim 1, further comprising representing a space of optimization alternatives for a combinatorial optimization problem by a recursive data structure, wherein a solved subtask is represented only once in the data structure.

4. The method of claim 1, further comprising representing a space of optimization alternatives for a combinatorial optimization problem by a recursive data structure, wherein the reentrant finite state machine includes a state to indicate that the solution to the given subtask has been identified.

5. The method of claim 1, wherein the reentrant finite state machine includes a state to generate one or more subdivided subtasks for a given subtask.

6. The method of claim 1, wherein the combinatorial optimization problem is received in a single-thread view.

7. The method of claim 1, wherein the combinatorial optimization problem is determining an efficient query execution plan for a database query.

8. The method of claim 7, wherein the query execution plan is represented as a query plan tree whose nodes correspond to query operators.

9. The method of claim 8, wherein a space of optimization alternatives is encoded in a recursive data structure that represents a set of sub-goals of the query execution plan, wherein each sub-goal corresponds to a node in the query plan tree.

10. The method of claim 9, wherein a space of optimization alternatives is encoded in a data structure that represents each sub-goal as a group comprising alternative primitives.

11. The method of claim 10, wherein the reentrant finite state machine includes a first state to iterate on child groups of primitives, and a subsequent second state to operate on the primitive itself.

12. A system, comprising:
a processor; and
a memory coupled with the processor, wherein the memory is configured to provide the processor with instructions which when executed cause the processor to:
represent each of a plurality of subtasks configured to explore optimization alternatives for a combinatorial optimization problem by a reentrant finite state machine;
represent a space of optimization alternatives for a combinatorial optimization problem by a recursive data structure, wherein a solved subtask is represented only once in the data structure;
assign a first subtask of the plurality of subtasks to a first processing thread, and a second subtask of the plurality of subtasks to a second processing thread;
determine that processing a current state of a first state machine associated with the first subtask is in a blocked condition that cannot be completed until the second subtask has been completed; and
suspend the first state machine for future reentrance and making the first processing thread available to perform a third subtask not currently in the blocked condition.

13. The system of claim 12, wherein the combinatorial optimization problem is determining an efficient query execution plan for a database query.

14. A computer program product, the computer program product being embodied in a tangible computer readable storage medium and comprising computer instructions for:
representing each of a plurality of subtasks configured to explore optimization alternatives for a combinatorial optimization problem by a reentrant finite state machine;
representing a space of optimization alternatives for a combinatorial optimization problem by a recursive data structure, wherein a solved subtask is represented only once in the data structure;
assigning a first subtask of the plurality of subtasks to a first processing thread, and a second subtask of the plurality of subtasks to a second processing thread;
determining that processing a current state of a first state machine associated with the first subtask is in a blocked condition that cannot be completed until the second subtask has been completed; and
suspending the first state machine for future reentrance and making the first processing thread available to perform a third subtask not currently in the blocked condition.

15. The computer program product of claim 14, wherein the combinatorial optimization problem is determining an efficient query execution plan for a database query.

* * * * *